(12) United States Patent
Naito

(10) Patent No.: US 6,953,902 B2
(45) Date of Patent: Oct. 11, 2005

(54) VEHICULAR TURN-INDICATOR SYSTEM

(75) Inventor: Hiroyuki Naito, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 11/004,819

(22) Filed: Dec. 7, 2004

(65) Prior Publication Data

US 2005/0133349 A1 Jun. 23, 2005

(30) Foreign Application Priority Data

Dec. 8, 2003 (JP) ........................................ 2003-408948

(51) Int. Cl.[7] ................................................. H01H 3/16
(52) U.S. Cl. .................................. 200/61.3; 200/61.54
(58) Field of Search .......................... 200/61.27, 61.28, 200/61.3–61.35, 61.54

(56) References Cited

U.S. PATENT DOCUMENTS

| | | | |
|---|---|---|---|
| 5,920,047 A | * | 7/1999 | Akimoto et al. .......... 200/61.54 |
| 6,237,437 B1 | * | 5/2001 | Takahashi .................. 74/484 R |
| 6,260,431 B1 | * | 7/2001 | Yokoyama .................... 74/469 |
| 6,472,623 B1 | * | 10/2002 | Hayashi .................... 200/61.27 |

FOREIGN PATENT DOCUMENTS

JP          2003-25908         1/2003

* cited by examiner

Primary Examiner—Elvin G. Enad
Assistant Examiner—Lisa Klaus
(74) Attorney, Agent, or Firm—Morgan, Lewis & Bockius LLP

(57) ABSTRACT

A restricting projecting portion is provided on an upper surface of a bracket in the vicinity of an apex portion of an angled cam projecting portion for guiding the movement of a shaft portion of a ratchet. When an operation lever and a bracket are returned to a neutral position from a left-turn indicating position or a right-turn indicating position, the force of the shaft portion of the ratchet is weakened through the abutment of the shaft portion of the ratchet against a bearing surface of the restricting projecting portion, whereby the passage of the shaft portion across the apex portion of the cam projecting portion to an opposite side is restricted. This facilitates the stopping of the bracket and hence the operation lever at the neutral position.

3 Claims, 5 Drawing Sheets

VEHICULAR TURN-INDICATOR SYSTEM

BACKGROUND OF THE INVENTION

The present invention relates to a vehicular turn-indicator system which facilitates the stopping of an operation lever and a bracket at a neutral position when the operation lever and the bracket are returned to the neutral position from a left- or right-turn indicating position.

A related vehicular turn-indicator system is constructed as below. A turn direction indicating operation lever is designed to be operated to rotate together with a bracket about a neutral position between a left-turn indicating position and a right-turn indicating position relative to a case. An excess movement restricting surface of an excess movement restricting mechanism is provided on the case side. The excess movement restricting surface has a neutral position root portion which is positioned between two sloping surfaces and a left-turn indicating position holding portion and a right-turn indicating position holding portion which are positioned on sides of the neutral position root portion. An excess movement restricting piece, which is biased to the excess movement restricting surface side by a spring, is provided at a distal end portion of the bracket in such a manner as to move in an axial direction, and the excess movement restricting piece is adapted to move on the excess movement restricting surface as the operation lever is operated to rotate. The excess movement restricting mechanism of the bracket is made up of the excess movement restricting surface, the excess movement restricting piece and the spring.

In this case, the bracket and hence the operation lever are selectively held at the neutral position, the left-turn indicating position and the right-turn indicating position as the excess movement restricting piece is selectively held at the neutral position root portion, the left-turn indicating position holding portion and the right-turn indicating position holding portion on the excess movement restricting surface. Then, a cancel mechanism is provided for imparting the bracket an operating force acting in a direction to return the bracket to the neutral position as a steering wheel is operated in an opposite direction to a direction indicated by the bracket which is positioned at the left-turn indicating position or the right-turn indicating position.

In the vehicular turn-indicator system that is constructed as has been described above, in the event that an attempt is made to reduce the operating force for operating the operation lever with a view to improving the operation feeling of the operation lever, the momentum gained by the operating lever and the bracket when they are returned from the left-turn indicating position or the right-turn indicating position to the neutral position is so strong that the excess movement restricting piece of the excess movement restricting mechanism is caused to pass through the neutral position root portion to reach the vicinity of a ridge portion located on an opposite side to the left-turn indicating position or the right-turn indicating position where they were located before, whereby there may be caused a risk that an opposite side turn switch is switched on to turn on an opposite side turn signal lamp.

With a view to dealing with the problem like this, a patent document 1 discloses a vehicular turn-indicator system in which an angled projecting portion is provided so as to be positioned in the vicinity of the neutral position root portion at a bottom portion within the case, so that the excess movement restricting piece at the distal end portion of the bracket comes to abut with a sloping surface of the projecting portion when the bracket is returned from the left-turn indicating position or the right-turn indicating position to the neutral position, whereby the momentum of the bracket and the operation lever is weakened, thereby attempting to facilitate the stopping of the operation lever and the bracket at the neutral position.

Patent Document 1: JP-A-2003-25908

In the vehicular turn-indicator system disclosed in the patent document 1, however, there exists a problem that imparting a proper gradient to the sloping surfaces of the projecting portion with which the excess movement restricting pieces is brought into abutment. Namely, in the event that the gradient of the sloping surfaces of the projecting portion is too steep, the bracket is made difficult to return to the neutral position, and on the contrary, in the event that the gradient is too moderate or less steep, the effect of facilitating the stopping of the bracket at the neutral position is reduced.

SUMMARY OF THE INVENTION

The invention was made to solve the problem and an object thereof is to provide a vehicular turn-indicator system which can facilitate further the stopping of the operation lever and the bracket at the neutral position when they are returned from the left-turn indicating position or the right-turn indicating position to the neutral position with a simple construction.

In order to solve the aforesaid object, the invention is characterized by having the following arrangement.

(1) A vehicular turn-indicator system comprising:

a bracket provided that is movable about a neutral position between a left-turn indicating position and a right-turn indicating position together with an operation lever;

a turn switch that is operated according to a rotation of the bracket;

an excess movement restricting mechanism that selectively holds the bracket at the neutral position, the left-turn indicating position and the right-turn indicating position;

a canceling mechanism for imparting to the bracket an operation force in a direction to return the bracket to the neutral position based on a rotation of a cancel cam, which is adapted to be rotated by a steering wheel with the bracket being positioned at the left-turn indicating position or the right-turn indicating position, to an opposite direction to a direction indicated by the bracket, wherein the canceling mechanism including an angled cam projecting portion provided on the bracket, and a ratchet that includes a shaft portion relatively movable along the cam projecting portion, wherein the ratchet is adapted to rotate about the shaft portion, and is provided in such a manner as to be biased toward the cancel cam by a spring, wherein when the bracket is positioned at the neutral position, the shaft portion is positioned at an apex portion of the cam projecting portion so that the ratchet is moved to a reverse position, and when the bracket is positioned at the left-turn indicating position or the right-turn indicating position, the shaft portion is positioned at a foot portion of the cam projecting portion and the ratchet is moved to a projecting position where a distal end portion of the ratchet projects toward the cancel cam, and wherein when the cancel cam is rotated in an opposite direction to the direction indicated by the bracket, the ratchet in the projecting position is rotated by the cancel cam in a direction to the neutral position; and a restrictive projecting portion that is provided on the bracket at a position in a vicinity of the apex portion of the cam projecting portion for restricting a passage of the shaft portion of the ratchet across the apex portion of the cam projecting portion to an opposite side, when the bracket returns to the neutral position from the left-turn indicating position or the right-turn indicating position.

(2) The vehicular turn-indicator system according to (1), wherein the restrictive projecting portion is provided so that the shaft portion of the ratchet passes between the restrictive projecting portion and the cam projecting portion.

(3) The vehicular turn-indicator system according to (2), wherein the restricting projecting portion includes a V-shaped bearing surface to confront the apex portion of the cam projecting portion with a predetermined gap.

According to the construction described above, when the cancel cam is rotated to the opposite side to the direction indicated by the operation lever and the bracket, which are positioned at the left-turn indicating position or the right-turn indicating position, the ratchet is rotated by the cancel cam, whereby the bracket and hence the operation lever are returned to the neutral position. As this occurs, while the ratchet is rotating about the shaft portion, the shaft portion moves relatively along the cam projecting portion. Then, the shaft portion is restricted from passing across the apex portion of the cam projecting portion to the opposite side by the restricting projecting portion provided in the vicinity of the apex portion of the cam projecting portion, and as a result, it is ensured that the bracket stops at the neutral position. In this case, since the restricting projecting portion may be formed into any shape which can restrict the passage of the shaft portion across the apex portion of the cam projecting portion to the opposite side, the setting of the construction for restricting the passage of the shaft portion across the neutral position becomes easier when compared with the related example in which the projecting portion is provided to which the excess movement restricting piece is brought into abutment, and hence the construction of the system can be made simple.

According to the aspect of the invention, when returning the operation lever and the bracket, which are positioned at the left-turn indicating position or the right-turn indicating position, to the neutral position, the stopping of the operation lever and the bracket at the neutral position can be facilitated further.

DETAILED DESCRIPTION OF PREFERRED EMBODIMENTS

Figure 1:
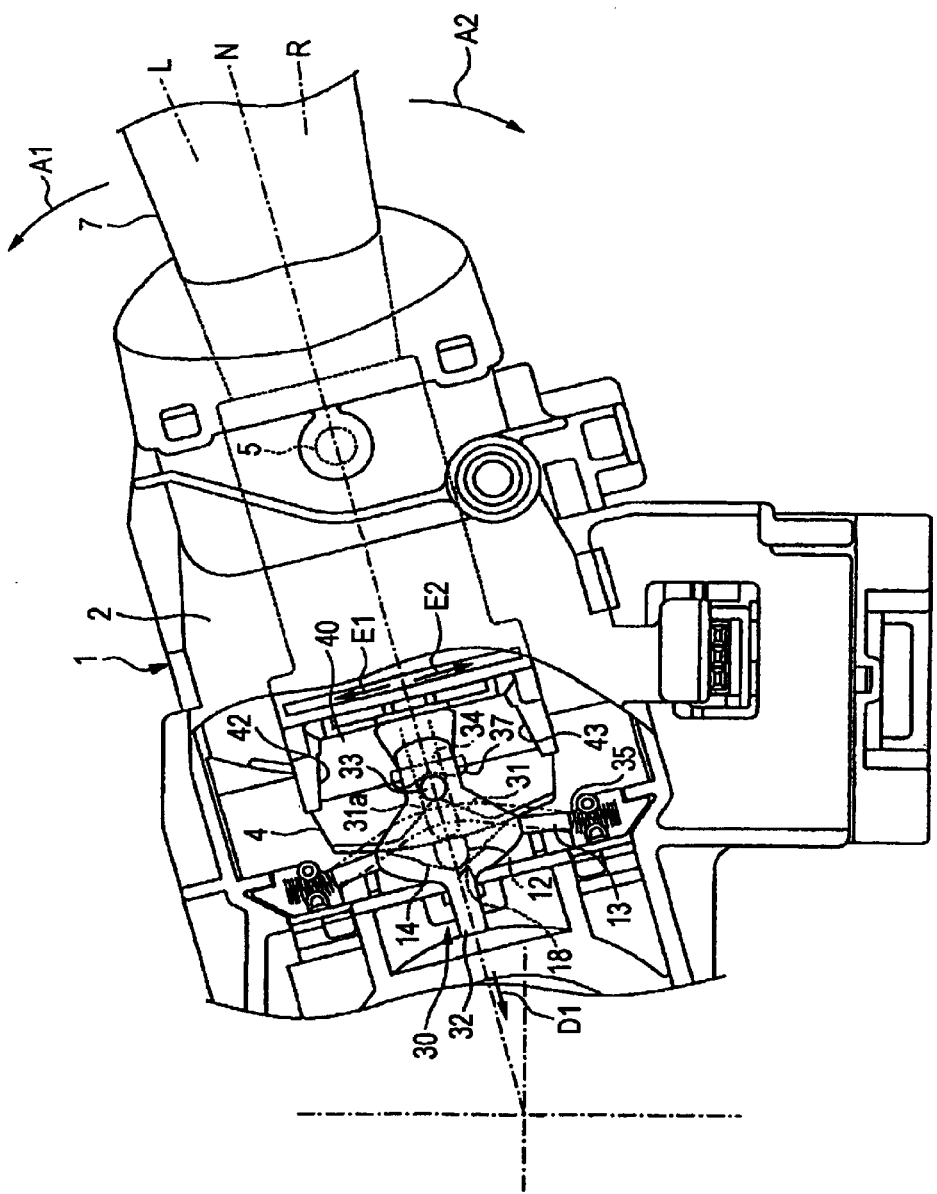
FIG. 1 is a partially broken-away plan view of an embodiment of the invention, which shows a state in which an operation lever and a bracket are positioned at a neutral position N.

Hereinafter, an embodiment of the invention will be described by reference to the accompanying drawings. Firstly, in FIGS. 1 and 2, a unit case 1 of a turn-indicator system is provided on a column cover portion through which a steering shaft, not shown, is passed in such a manner as to project sideways from the column cover portion. This unit case 1 is made up of a combination of an upper cover 2 and a lower wiring circuit board 3, and a bracket 4 is provided in the unit case 1 in such a manner as to rotate about a shaft 5 in a direction indicated by an arrow A1 and a direction indicated by an arrow A2 in FIG. 1. A lever inserting portion 6 is formed in the bracket 4, and a proximal end portion of an operation lever 7 is inserted into this lever inserting portion 6. The operation lever 7 is provided in such a manner as to rotate relative to the bracket 4 about a shaft 8 in a direction indicated by an arrow B1 and a direction indicated by an arrow B2 in FIG. 2, as well as in such a manner as to rotate together with the bracket 4 about the shaft 5 in the directions indicated by the arrows A1 and A2.

Figure 3:
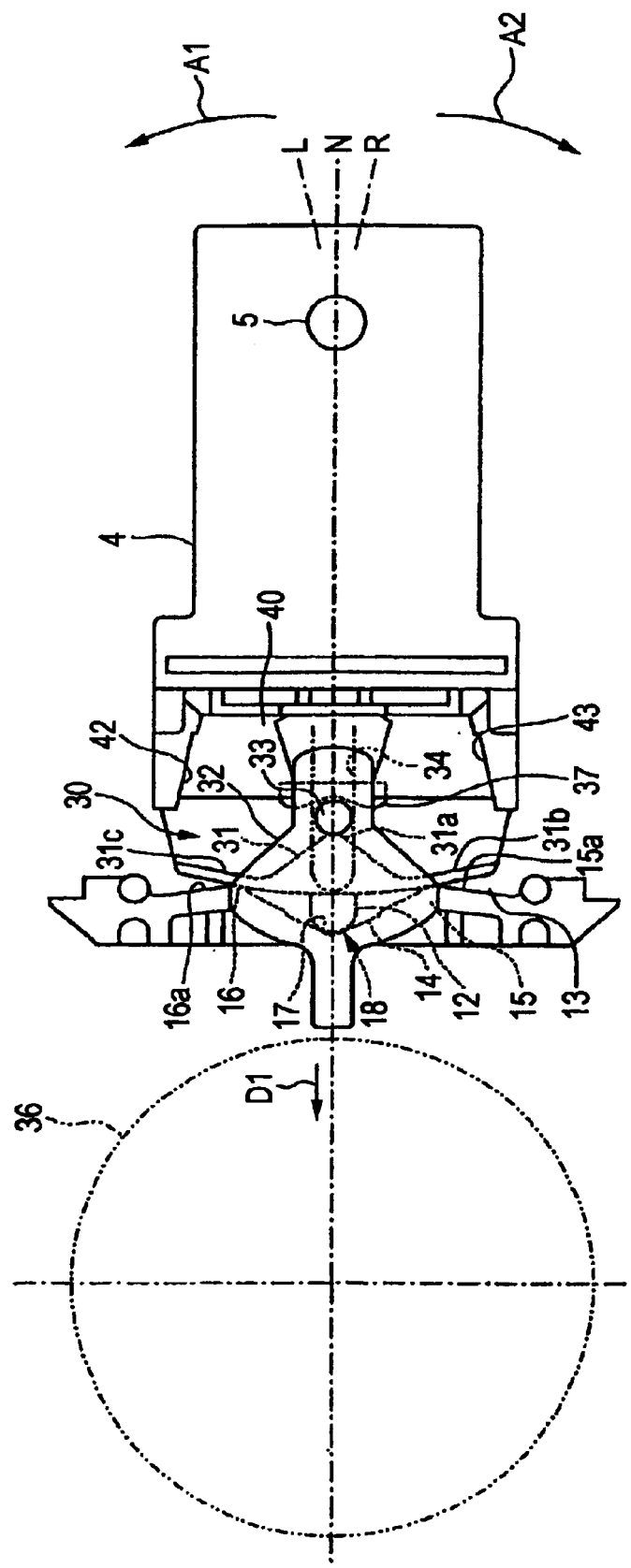
FIG. 3 is a plan view of a main part of the embodiment in the state shown in FIG. 1.
Figure 4:
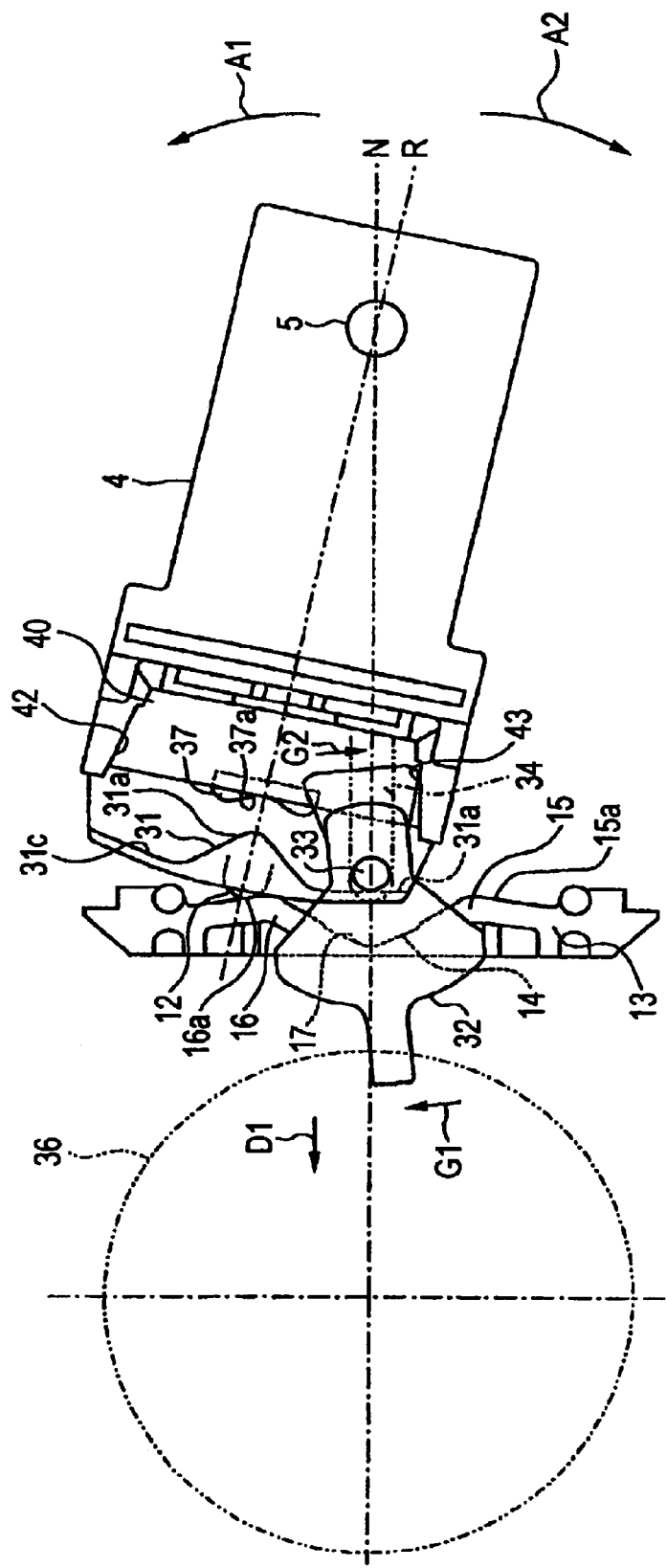
FIG. 4 is a view corresponding to FIG. 3, which shows a state in which the bracket is positioned at a right-turn indicating position R.

A piece accommodating portion 10, which is made to open at a distal end thereof, is formed on a distal end portion side of the bracket 4, and a compression coil spring 11 and an excess movement restricting piece 12 are accommodated in the piece accommodating portion. The excess movement restricting piece 12 is biased in a direction to project from the piece accommodating portion 10. An excess movement restricting surface member 13 is disposed in a stationary state within the unit case 1 at a location which confronts a distal end of the excess movement restricting piece 12. As shown in FIGS. 3 and 4, a first excess movement restricting surface 14 for turning direction indicating operation is formed on the excess movement restricting surface member 13.

A V-shaped neutral position root portion 17 is formed between two ridge portions 15, 16 on the first excess movement restricting surface 14, and portions expanding outwardly from apex portions of the ridge portions 15, 16 are made to constitute a left-turn indicating position holding portion 15a and a right-turn indicating position holding portion 16a, respectively. The excess movement restricting piece 12 is brought into press contact with the excess movement restricting surface 14. Here, a first excess movement restricting mechanism 18 (corresponding to an excess movement restricting mechanism according to the invention) in a direction in which the bracket 4 turns is made up of the first excess movement restricting surface 14, the excess movement restricting piece 12 and the compression coil spring 11.

Figure 2:
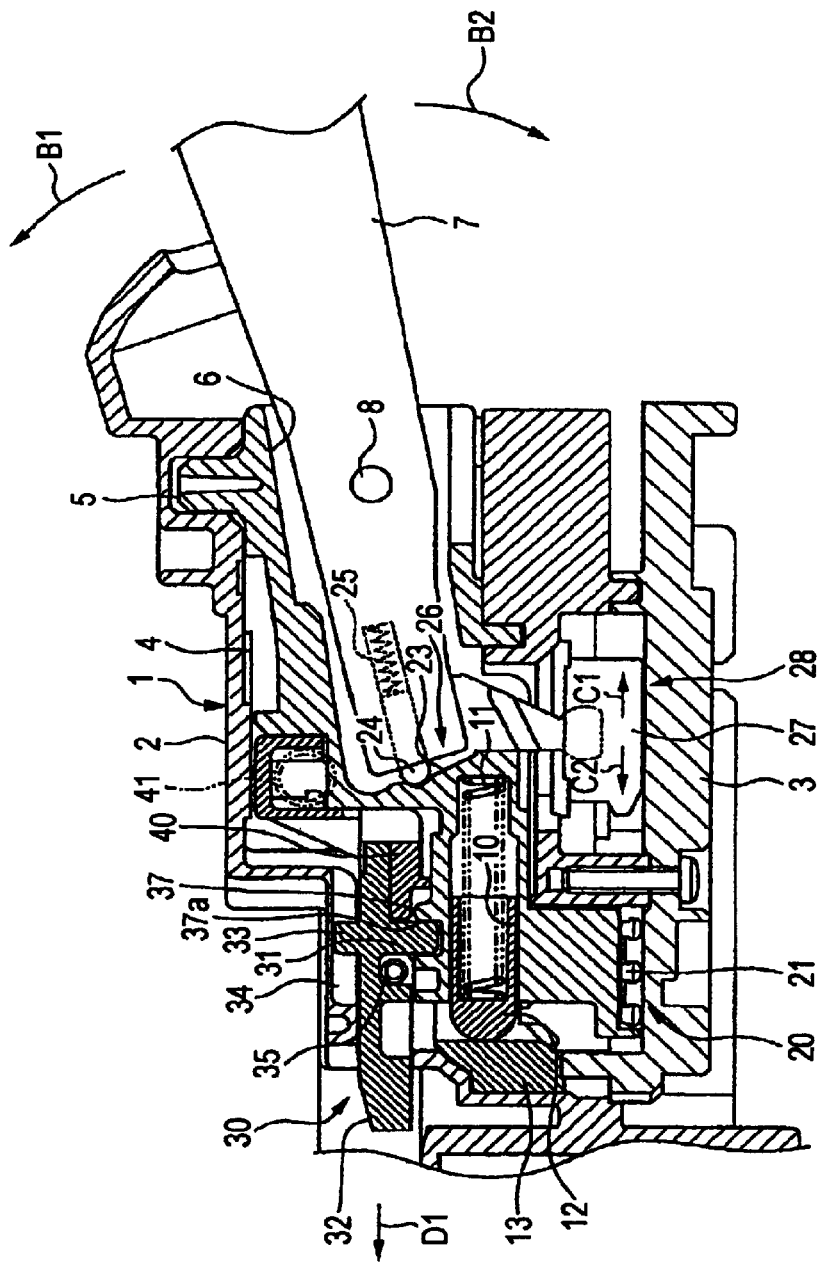
FIG. 2 is a longitudinally cross-sectional view of the embodiment in that state.

In this case, as shown in FIGS. 1 to 3, with the excess movement restricting piece 12 being held at the neutral position root portion 17, the bracket 4 and the operation lever 7 are held at a neutral position N (in FIG. 3, the operation lever 7 is omitted), with the excess movement restricting piece 12 being held at the left-turn indicating position holding portion 15a, the bracket 4 and the operation lever 7 are held at a left-turn indicating position L, and with the excess movement restricting piece 12 being held at the right-turn indicating position holding portion 16a, the bracket 4 and the operation lever 7 are held at a right-turn indicating position R (also in FIG. 4, the operation lever 7 is omitted).

A turn switch 20 is provided between the bracket 4 and the wiring circuit board 3. This turn switch 20 is made up of a stationary contact, not shown, which is provided on the wiring circuit board 3 side and a movable contact 21 which is adapted to move together with the bracket 4 so as to be in contact with and separate from the stationary contact. In this case, a left-turn indicating switch of the turn switch 20 is switched on as the bracket 4 is rotated from the neutral position to a position just before the left-turn indicating position L, and a right-turn indicating switch of the turn switch 20 is switched on as the bracket 4 is rotated to a position just before the right-turn indicating position R.

In addition, a second excess movement restricting surface 23 for dimmer/flash-to-pass operation is formed on an interior surface of the lever inserting portion 6 in the bracket 4 at a location which confronts the proximal end portion of the operation lever 7. Additionally, an excess movement restricting piece 24 adapted to slide over the second excess movement restricting surface 23 and a compression coil spring 25 for biasing the excess movement restricting piece 24 toward the excess movement restricting surface 23 are provided at the proximal end portion of the operation lever, and a second excess movement restricting mechanism 26 for dimmer/flash-to-pass operation is constituted by the second excess movement restricting surface 23, the excess movement restricting piece 24 and the compression spring 24. A contact holder 27, which is adapted to move in directions indicated by arrows C1 and C2 as the operation lever 7 rotates in the directions indicated by the arrows B1 and B2, is provided below the proximal end portion of the operation lever 7, and a dimmer/flash-to-pass switch 28 is provided between the contact holder 27 and the wiring circuit board 3.

Figure 5:
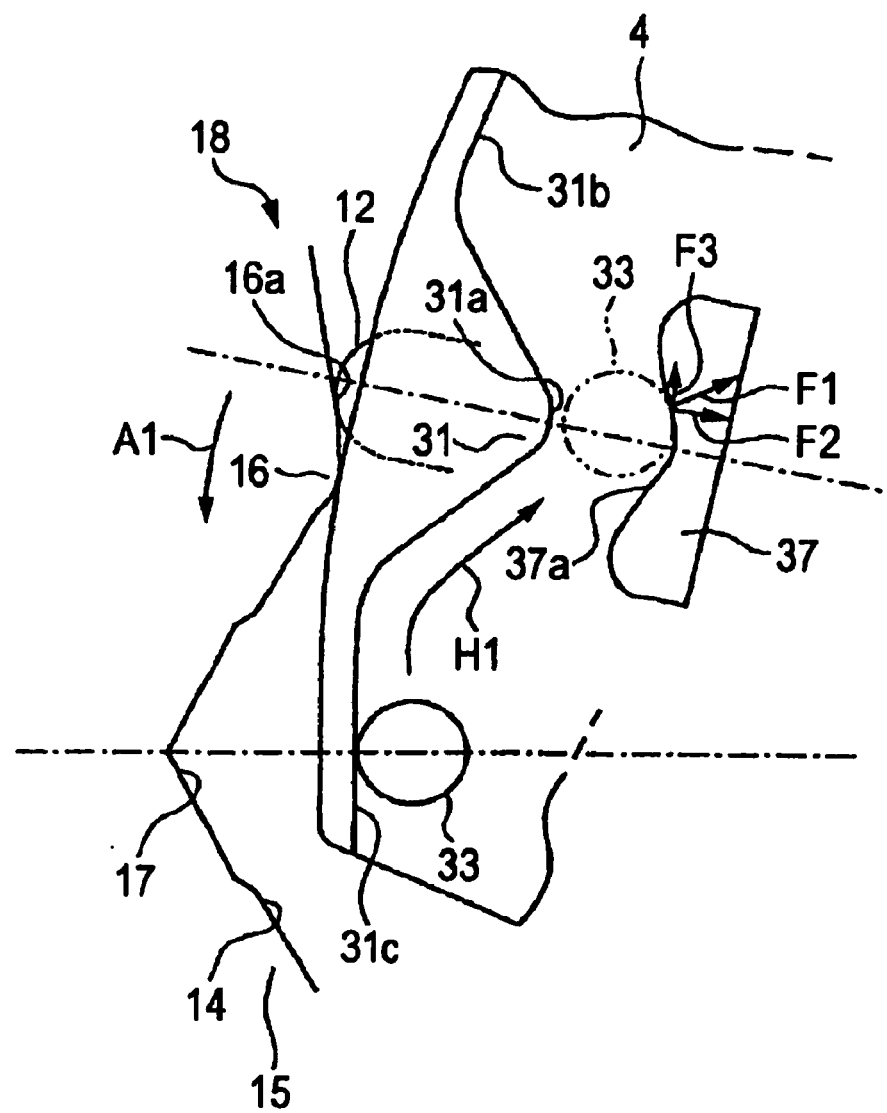
FIG. 5 is an enlarged plan view of the main part.

A cancel mechanism 30 is provided on an upper surface side of the bracket 4, and the portion of this cancel mechanism 30 will be described below. As also shown in FIGS. 3 to 5, an angled cam projecting portion 31 is provided on an upper surface of the bracket 4 at a distal end portion thereof. This cam projecting portion 30 has an apex portion 31a and foot portions 31b, 31c. A ratchet 32 is disposed between the upper surface of the bracket 4 and the upper case 2. This ratchet 32 has a vertically projecting cylindrical shaft portion 33 which is made integral with the ratchet 32 at a central portion thereof, so that the ratchet 32 can rotate about the shaft portion 33. A lower portion of the shaft portion 33 is disposed in such a manner as to relatively move along the cam projecting portion 31, whereas an upper portion thereof is disposed in such a manner as to move left and right as seen in FIG. 3 along an elongated guide hole 34 formed in a lower surface of the upper case 2.

Then, a coil spring 35 is hooked to the ratchet 32, so that the ratchet 32 is biased by the coil spring 35 in a direction indicated by an arrow D1 shown in FIGS. 1 to 3. A cancel cam (a rotating locus 36 of the cancel cam is shown by a chain double-dashed line in FIG. 3) adapted to be rotated in the same direction as a steering wheel, not shown, is disposed at a distal end portion of the ratchet 32 in the direction indicated by the arrow D1, and consequently, the ratchet 32 is biased toward the cancel cam side by the coil spring 35.

In addition, a restricting projecting portion 37 having a V-shaped bearing surface 37a is provided integrally on the upper surface side of the bracket 4 in such a manner as to confront the apex portion 31a of the cam projecting portion 31 with a predetermined gap being provided between the apex portion 31a and the restricting projecting portion 37 itself (refer to FIG. 5). The shaft portion 33 of the ratchet 32 is designed to pass through the gap between the bearing surface 37a of the restricting projecting portion 37 and an outer circumferential portion of the apex portion 31a.

A back plate 40 is disposed on the upper surface side of the bracket 4 at a position underneath a rear part (a right part as seen in FIGS. 1 to 3) of the ratchet 32 in such a manner as to extend toward the rear of the ratchet 32. This back plate 40 is provided in such a manner as to move in directions indicated by arrows E1 and E2 shown in FIG. 1 and is held at a position shown in FIGS. 1 and 3 by a coil spring 41. Ratchet abutment portions 42, 43 are provided on both sides of the back plate 40 which hold the rear part of the ratchet 32 therebetween.

Next, the function of the vehicular turn-indicator system that is constructed as has been described heretofore will be described below.

As shown in FIGS. 1 to 3, with the operation lever 7 and the bracket 4 being positioned at the neutral position N, the distal end portion of the excess movement restricting piece 12 of the bracket 4 enters the neutral position root portion 17 in the first excess movement restricting surface 14, and the turn switch 20 is in an off state. In addition, the shaft portion 33 of the ratchet 32 is moved to the reverse position to thereby be in abutment with the apex portion 31a of the cam projecting portion 31. In this state, the distal end portion of the ratchet 32 is positioned at a position located backwards to the right from the rotating locus of the cancel cam 36.

When the driver operates to rotate the operation lever 7 in the direction indicated by the arrow A2 from the neutral position N in an attempt, for example, to turn right, the bracket 4 also rotates about the shaft 5 in the direction indicated by the arrow A2. In association with the rotation of the bracket 4, the distal end portion of the excess movement restricting piece 12 of the bracket 4 moves to climb up the sloping surface of the ridge portion 16 on the first excess movement restricting surface 14, and when the distal end portion reaches the right-turn indicating position holding portion 16a, the bracket 4 and the operation lever 7 are held at the right-turn indicating position R, as shown in FIG. 4. As this occurs, when the bracket 4 is rotated as far as just before the right-turn indicating position R, a right-turn indicating switch of the turn switch 20 is switched on, and based on this, a right-turn turn signal lamp is caused to start flashing. In addition, as the bracket is rotated to the right-turn indicating position R like this, the shaft portion 33 of the ratchet 32 moves relatively to climb down a sloping surface of the cam projecting portion 31 so as to be eventually positioned at the foot 31c portion (refer to FIG. 4). In association with this movement, the ratchet 32 moves in the direction indicated by the arrow D1 to be positioned at a projecting position where the distal end portion thereof enters the interior of the rotating locus 36 of the cancel cam. As this occurs, an end portion of the rear part of the ratchet 32 comes to abut with or approaches the ratchet abutment portion 43 of the back plate 40, which is one of the abutment portions thereof.

In this state, when the steering wheel is operated to rotate leftward, that is, in an opposite direction to the right-turn direction which is being indicated, the cancel cam is also rotated in the same direction. Then, when the distal end portion of the ratchet 32 is pressed in a direction indicated by an arrow G1 shown in FIG. 4 by a projecting portion (not shown) of the cancel cam, the ratchet 32 rotates about the shaft portion 33 in a direction indicated by an arrow G2 shown in FIG. 4, whereby a rear end portion of the ratchet 32 pushes the ratchet abutment portion 43 of the back plate 40 in the same direction. Then, the bracket 4 and the operation lever 7 rotate about the shaft 5 in the direction indicated by the arrow A1, which is the direction to return to the neutral position N.

In association with the rotation of the bracket 4 and the operation lever 7 in the direction indicated by the arrow A1 from the right-turn indicating position R, the distal end portion of the excess movement restricting piece 12 of the bracket 4 moves to pass across the ridge portion 16 on the first excess movement restricting surface 14 to thereby climb down the sloping surface of the ridge portion 16 toward the neutral position root portion 17 side. As this occurs, the shaft portion 33 of the ratchet 32 moves along the outer circumferential portion of the cam projecting portion 31 so as to be relatively pulled in as indicated by an arrow H1 shown in FIG. 5 and climbs up the sloping surface of the cam projecting portion 31 to reach the position confronting the apex portion 31a. As this occurs, even in the event that the shaft portion 33 attempts to move with force in a direction to pass across the apex portion 31a, the shaft portion 33 comes into abutment with the bearing surface 37a of the restricting projecting portion 37 so that the forcible movement of the shaft portion 33 is weakened. In this case, the forcible movement is weakened by an amount corresponding to a force F3 shown in FIG. 5, whereby the force of the bracket 4 and hence the operation lever 7 exerted in the direction indicated by the arrow A1 is weakened so as to ensure the stopping of the bracket 4 and the operation lever 7 at the neutral position N.

A similar operation is performed, when the operation lever 7 is operated to rotate from the neutral position N to the left-turn indicating position L side, and also when the steering wheel is rotated rightward from the state where the operation lever 7 is positioned at the left-turn indicating position L, so that the operation lever 7 and the bracket 4 are returned to the neutral position N, and hence the description thereof will be omitted here.

According to the embodiment that has been described heretofore, the following advantages can be obtained. Namely, by providing the restricting projecting portion 37 in the vicinity of the apex portion 31a of the cam projecting portion 31 on the bracket 4 for restricting the shaft portion 33 of the ratchet 32 from passing across the apex portion 31a of the cam projecting portion 31 to the opposite side, when the operation lever 7 and the bracket 4 are returned to the neutral position N from the left-turn indicating position L or the right-turn indicating position R, the stopping of the operation lever 7 and the bracket 4 at the neutral position N can be facilitated, when the operation lever 7 and the bracket 4 are returned to the neutral position N from the left-turn indicating position L or the right-turn indicating position R. Moreover, in this case, since the restricting projecting portion 37 may be formed into any shape which can restrict the passage of the shaft portion 33 across the apex portion 31a of the cam projecting portion 31 to the opposite side, the setting of the restricting portion on the vehicular turn-indicator system can be made easier than the related case where the projecting portion is provided with which the excess movement restricting piece is brought into abutment, and hence the system can be constructed simply.

What is claimed is:

1. A vehicular turn-indicator system comprising:
   a bracket provided that is movable about a neutral position between a left-turn indicating position and a right-turn indicating position together with an operation lever;
   a turn switch that is operated according to a rotation of the bracket;
   an excess movement restricting mechanism that selectively holds the bracket at the neutral position, the left-turn indicating position and the right-turn indicating position;
   a canceling mechanism for imparting to the bracket an operation force in a direction to return the bracket to the neutral position based on a rotation of a cancel cam, which is adapted to be rotated by a steering wheel with the bracket being positioned at the left-turn indicating position or the right-turn indicating position, to an opposite direction to a direction indicated by the bracket,
   wherein the canceling mechanism including an angled cam projecting portion provided on the bracket, and a ratchet that includes a shaft portion relatively movable along the cam projecting portion,
   wherein the ratchet is adapted to rotate about the shaft portion, and is provided in such a manner as to be biased toward the cancel cam by a spring,
   wherein when the bracket is positioned at the neutral position, the shaft portion is positioned at an apex portion of the cam projecting portion so that the ratchet is moved to a reverse position, and when the bracket is positioned at the left-turn indicating position or the right-turn indicating position, the shaft portion is positioned at a foot portion of the cam projecting portion and the ratchet is moved to a projecting position where a distal end portion of the ratchet projects toward the cancel cam, and
   wherein when the cancel cam is rotated in an opposite direction to the direction indicated by the bracket, the ratchet in the projecting position is rotated by the cancel cam in a direction to the neutral position; and
   a restrictive projecting portion that is provided on the bracket at a position in a vicinity of the apex portion of the cam projecting portion for restricting a passage of the shaft portion of the ratchet across the apex portion of the cam projecting portion to an opposite side, when the bracket returns to the neutral position from the left-turn indicating position or the right-turn indicating position.

2. The vehicular turn-indicator system according to claim 1, wherein the restrictive projecting portion is provided so that the shaft portion of the ratchet passes between the restrictive projecting portion and the cam projecting portion.

3. The vehicular turn-indicator system according to claim 2, wherein the restricting projecting portion includes a V-shaped bearing surface to confront the apex portion of the cam projecting portion with a predetermined gap.

* * * * *